March 31, 1970     F. R. P. MARTIN     3,504,171
VEHICLE LAMP MOUNTINGS
Filed Sept. 13, 1967     12 Sheets-Sheet 1
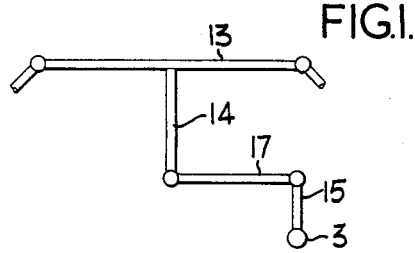
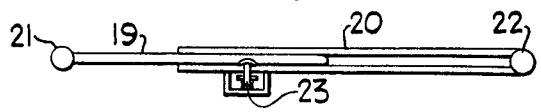
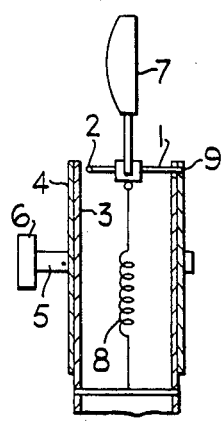
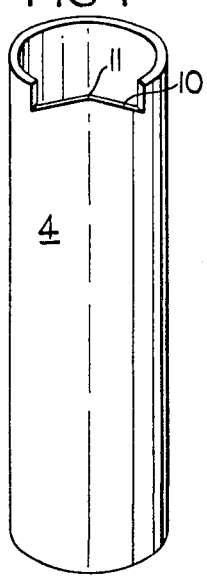
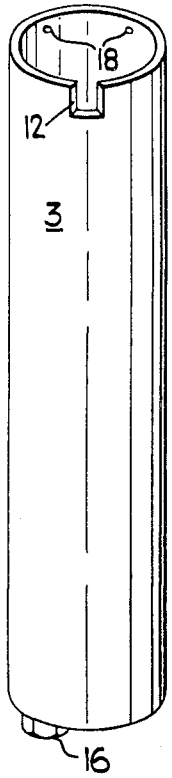
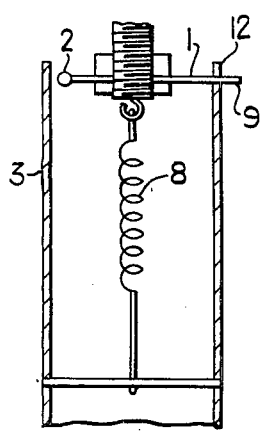
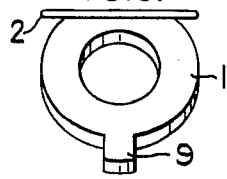
Inventor
Frederick R. P. Martin March 31, 1970  F. R. P. MARTIN  3,504,171
VEHICLE LAMP MOUNTINGS Filed Sept. 13, 1967　　12 Sheets-Sheet 2

Inventor
Frederick R. P. Martin

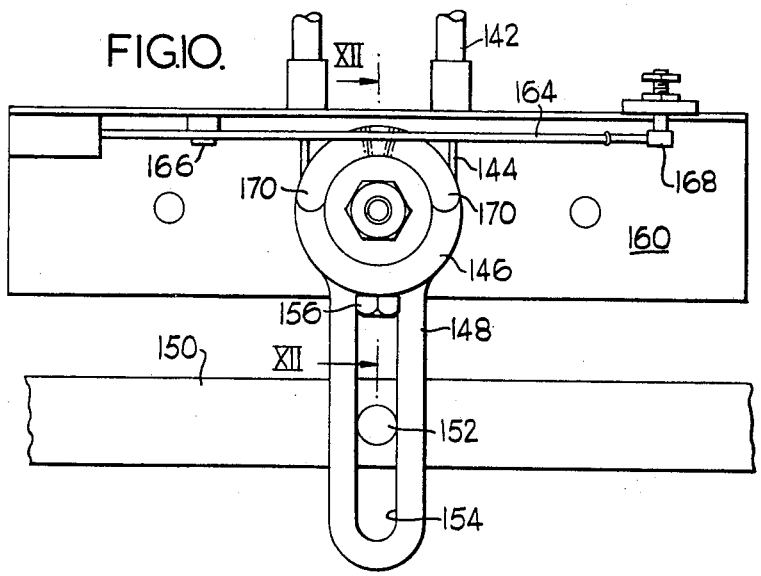
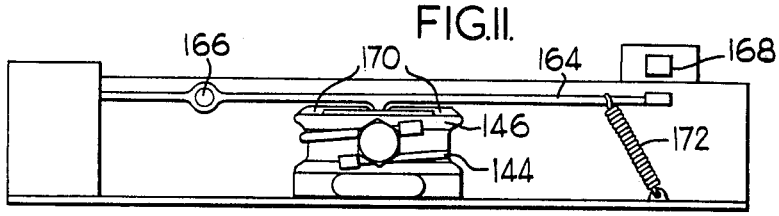
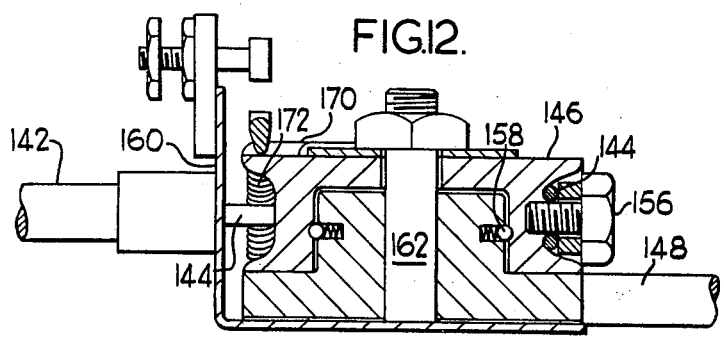

March 31, 1970  F. R. P. MARTIN  3,504,171
VEHICLE LAMP MOUNTINGS
Filed Sept. 13, 1967  12 Sheets-Sheet 4
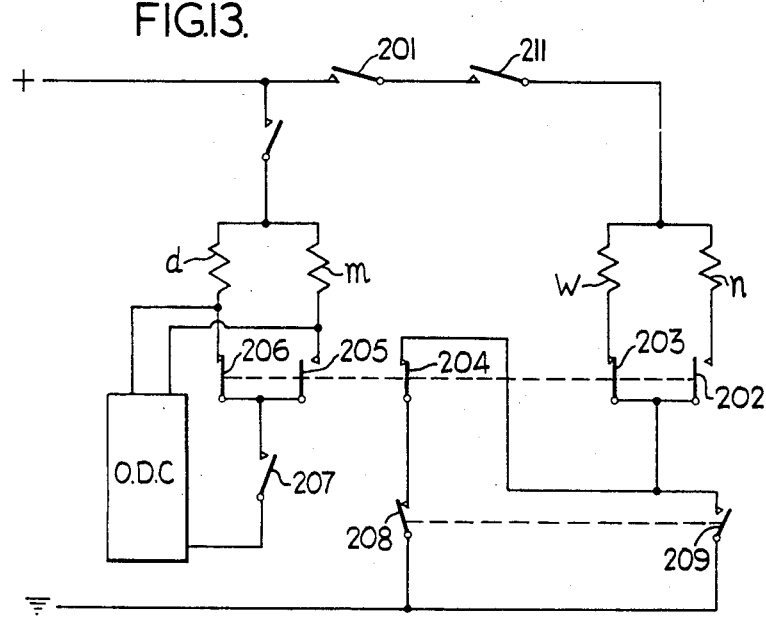
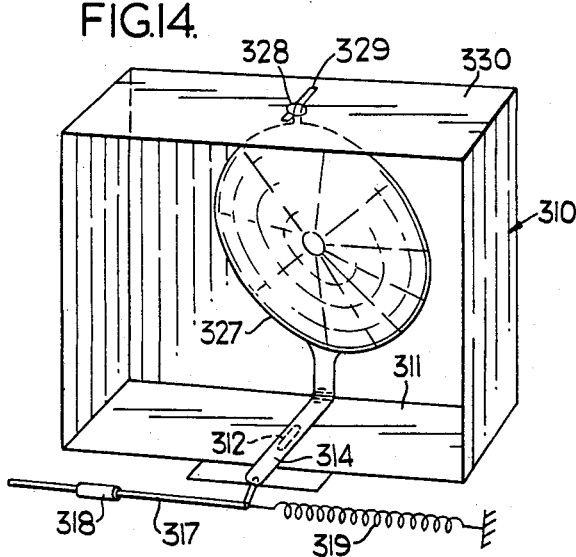
Frederick R. P. Martin
Inventor March 31, 1970     F. R. P. MARTIN     3,504,171

VEHICLE LAMP MOUNTINGS

Filed Sept. 13, 1967     12 Sheets-Sheet 5

Frederick R. P. Martin, Inventor

March 31, 1970  F. R. P. MARTIN  3,504,171
VEHICLE LAMP MOUNTINGS
Filed Sept. 13, 1967  12 Sheets-Sheet 6
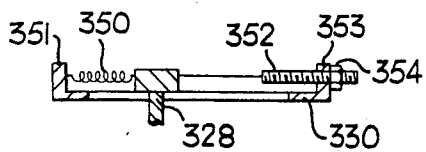
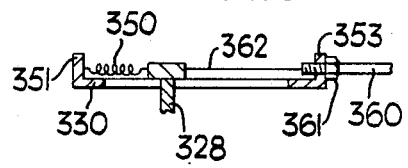
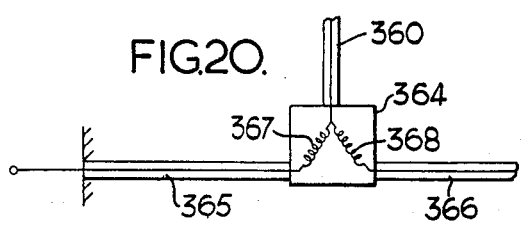
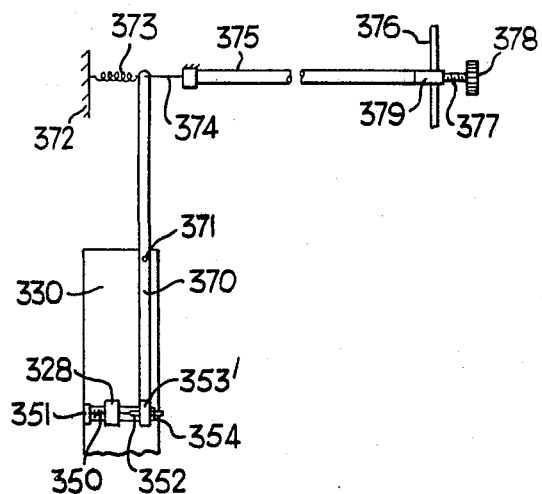

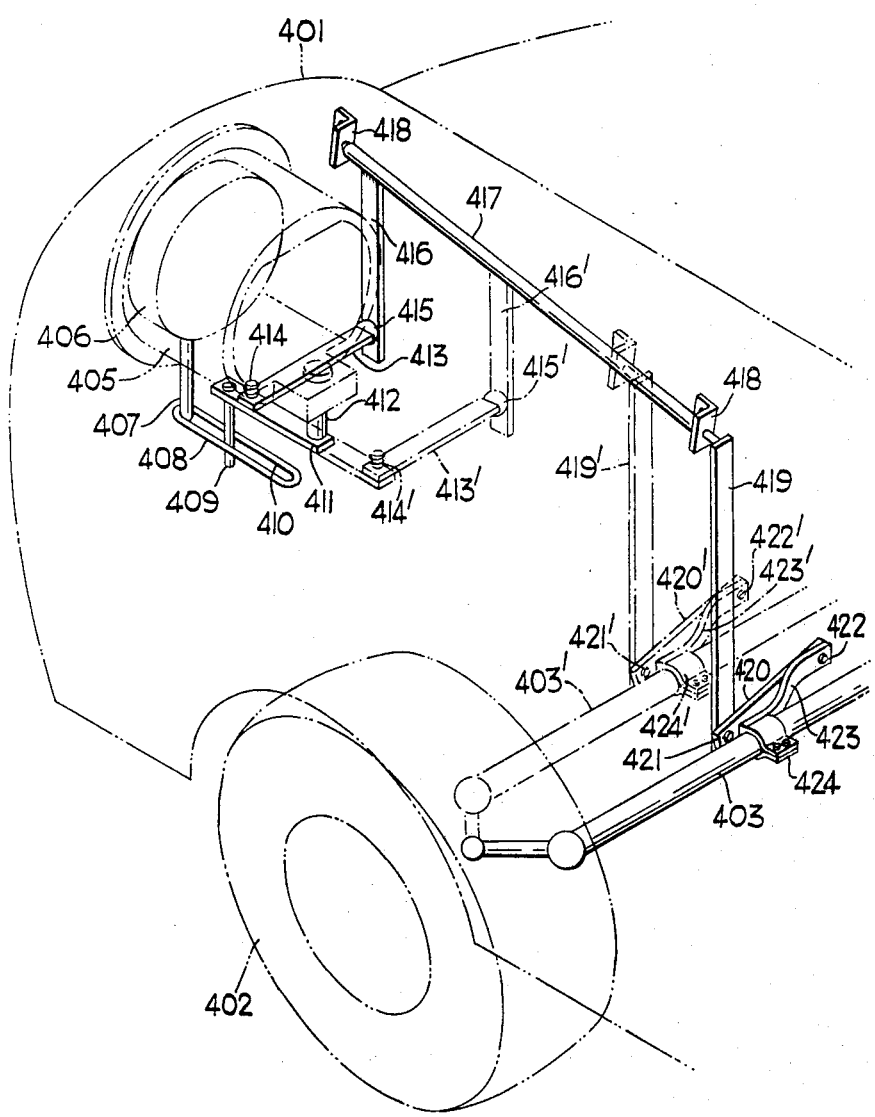

March 31, 1970 F. R. P. MARTIN 3,504,171
VEHICLE LAMP MOUNTINGS
Filed Sept. 13, 1967 12 Sheets-Sheet 8

Inventor
Frederick R. P. Martin

March 31, 1970   F. R. P. MARTIN   3,504,171
VEHICLE LAMP MOUNTINGS
Filed Sept. 13, 1967   12 Sheets-Sheet 9
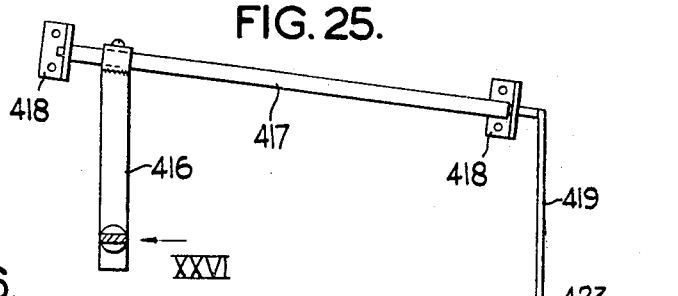
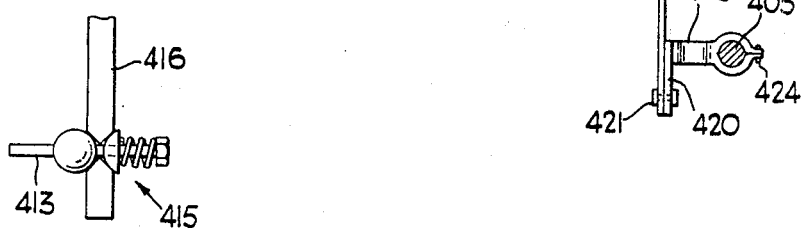
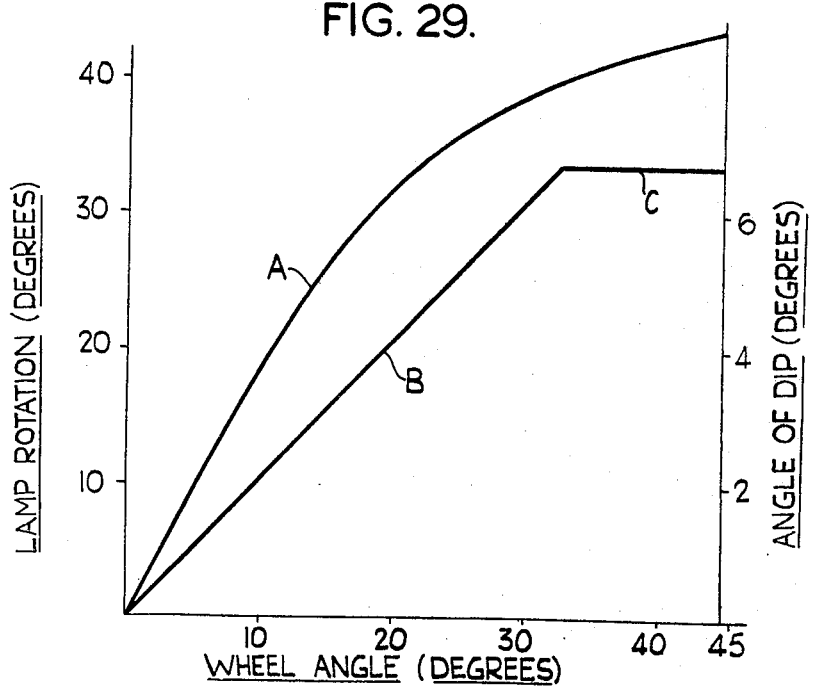
Inventor
Frederick R. P. Martin March 31, 1970  F. R. P. MARTIN  3,504,171
VEHICLE LAMP MOUNTINGS
Filed Sept. 13, 1967  12 Sheets-Sheet 10
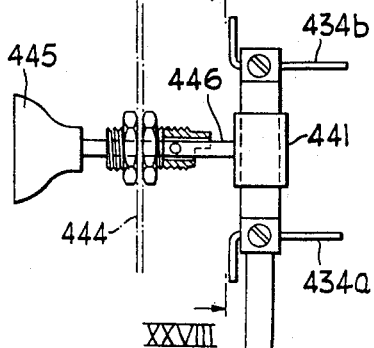
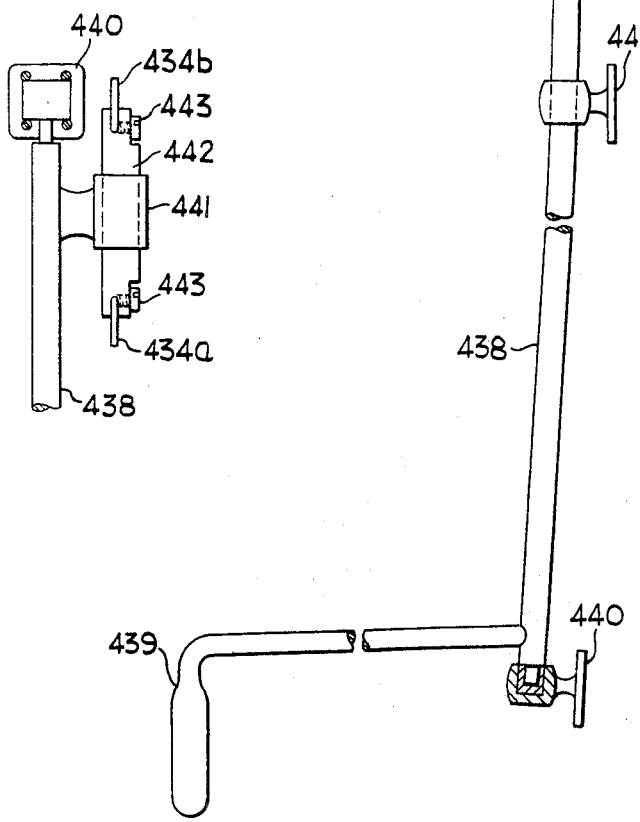

March 31, 1970     F. R. P. MARTIN     3,504,171
VEHICLE LAMP MOUNTINGS

Filed Sept. 13, 1967     12 Sheets-Sheet 11

March 31, 1970     F. R. P. MARTIN     3,504,171

VEHICLE LAMP MOUNTINGS

Filed Sept. 13, 1967     12 Sheets-Sheet 12

Frederick R. P. Martin, Inventor

3,504,171
VEHICLE LAMP MOUNTINGS
Frederick R. P. Martin, Kent, England, assignor to Rotadipper Limited, Kent, England, a British company
Continuation-in-part of application Ser. No. 527,196, Feb. 14, 1966. This application Sept. 13, 1967, Ser. No. 667,590
Claims priority, application Great Britain, Feb. 3, 1966, 4,851/66; Sept. 19, 1966, 41,761/66; Aug. 18, 1967, 38,237/67
Int. Cl. B60q 1/12
U.S. Cl. 240—62.52           36 Claims

ABSTRACT OF THE DISCLOSURE

A vehicle lamp mounting connected with the steering mechanism of the vehicle for rotation and tilting movement in response to movement of the steering mechanism. A releasable coupling is provided between the lamp mounting and the steering mechanism so that obstruction of the lamp movement will not hinder the steering of the vehicle. The member for connecting the drive mechanism with the lamp mounting is provided with a ball and socket joint at one end and a pivot joint at the opposite end, the axis of the pivot joint being aligned with the ball and socket joint for dampening out vibrations from the wheels before they reach the lamps. One embodiment of the lamp mounting consists of a first tubular member having a transversely extending pivotally mounted arm at one end. The lamp is mounted on the arm. The first tubular member has a slot through which the end of the arm extends. A second tubular member surrounds the first tubular member and has a cam surface on which the end of the arm rests. The second tubular member is stationarily mounted and the first tubular member rotates in response to movement of the vehicle steering mechanism. A second embodiment provides a rectangular enclosure, the upper side of the lamp being suspended from the upper surface of the enclosure. The lower side of the lamp is connected with the steering mechanism and is moved forwardly or rearwardly in response to movement of the steering mechanism.

CROSS-REFERENCE TO RELATED APPLICATION

This application is a continuation-in-part of my earlier application entitled "Vehicle Lamp Mountings" Ser. No. 527,196 filed February 14, 1966 now abandoned.

This invention relates to a mounting device adapted to support a lamp on a steerable vehicle so that the light emitted from the lamp can be directed from side to side in response to movements of the steering mechanism of the vehicle.

The fixed lamps normally provided on the front of a vehicle, although efficient when the vehicle is proceeding in a straight line, are frequently inefficient when the vehicle is going along a road having sharp bends. The present invention is therefore, directed to the problem of providing a mounting device whereby a lamp may be rotated in the direction in which the vehicle is being steered. In addition to such simple pivoting movement the present invention also provides for automatic variation of the length of the beam during movements of the beam from side to side in response to steering movements of the vehicle. This satisfies the requirement that for a straight road a long beam is desirable to illuminate the road for a good distance ahead whereas when passing around bends the driver's visibility is restricted by the bend and it is desired for the beam from the lamp to be directed at the side of the road a short distance in front of the car. The device of the present invention automatically dips and shortens the beam the more the steering of the vehicle is turned. Thus the beam is only in operation for its maximum length when the steering is set straight, dipping and shortening of the beam being graduated in relation to the acuteness of the bend in the road. This arrangement makes it impossible to avoid dipping and shortening the beam when steering on the lock towards oncoming traffic.

According to the invention there is provided a lamp mounting device adapted to support a lamp on a steerable vehicle, such device comprising a support adapted to have a lamp secured thereto and a mounting member adapted to be secured to the vehicle, means being provided for connecting the support to the vehicle steering mechanism whereby in use of the device the support is rotatable with respect to the mounting member to cause rotational movement of a lamp thereon from side to side in response to movements of the steering mechanism, the arrangement being such that the lamp is dipped by downward tilting in response to rotational movement to either side of a median position. Preferably the support is carried for tilting movement by a supporting member rotatably carried by the mounting member, a cam arrangement being provided between the mounting member and the support whereby the support is tilted, preferably abount a hinge, in response to rotational movement of the supporting member with respect to the mounting member.

In one simple embodiment of the invention the support comprises an integral follower portion which is spring urged into contact with a cam surface on the mounting member, such cam surface comprising a peak corresponding with the median position of the lamp. In a constructional form described in detail hereinafter the supporting member comprises a first tube rotationally mounted in a second tube comprising the mounting member, the follower portion extending through a slot in the first tube to engage a cam surface provided on the second tube. In order to provide for ready adaption of the device to particular vehicles or to the idiosyncrasies of particular drivers the cam surface may be provided on a replaceable portion of the mounting member whereby the degree of dipping of the lamp during rotational movement thereof can be varied by changing a cam surface of one shape for another of a different shape.

Conveniently the support may comprise a disc hinged in one end of the first tube, a spring mounted within the first tube acting to draw the follower into contact with the cam surface.

Suitably the means for connecting the support to the steering mechanism may comprise a linkage connectable between the supporting member and the steering mechanism. This linkage may be so constructed as to be incapable of transmitting a force greater than a predetermined value. Preferably the linkage comprises a safety member comprising a rod slidably received in a tube such that when the force between the remote ends of the tube and rod exceed a predetermined value the rod slides within the tube. This construction ensures that should for any reason the device become damaged so as to jam there is no danger of the steering mechanism of the vehicle being held so as to render the vehicle unsteerable.

Suitably an adjustable screw may be threaded through the tube to engage the rod and provide an adjustable clamping force thereon. In an alternative embodiment a releasable mechanism may be provided for gripping the rod, such releasable mechanism comprising a spring loaded pin engaging in a recess in the rod and means for retracting the pin from the recess. Suitably a detent mechanism may be provided for holding the pin in retracted position so that the very minimum of interference is provided with the steering mechanism should the device jam. The provision of such a releasable mechanism also enables a driver to disconnect the lamp control device when the lamp is not in use.

As a further safety factor it is preferred that the beam be automatically extinguished when the car is put into reverse gear. This may readily be ensured by providing a switch controlling the lamp and operable to switch the lamp off when reverse gear is engaged.

In a further embodiment later described in detail the support comprises a cap fitting over the top of tubular supporting and mounting members and held in engagement with a cam surface at the top of the mounting member. Suitably the cap may be held against the cam surface by a spring extending internally of the supporting and mounting members. Preferably a drive is provided for connection to a vehicle steering mechanism, a releasable clutch arrangement being provided for connecting the drive to the supporting member. Suitably the drive may comprise a cable connection between a first pulley adapted to be connected to the supporting member by the clutch and a second pulley adapted to be directly actuable by the steering mechanism. The steering mechanism may include a drive connection adapted to slip when a predetermined torque is applied to the pulley.

A further preferred feature of the invention is the provision of an electrical switch for automatically switching on a lamp carried by the support when the vehicle steering mechanism has been rotated through a predetermined angle. Such an arrangement permits a driver using a vehicle to which the device of the present invention is fitted, to use the normal headlights of the car when driving straight ahead, the lamp carried by the device of the present invention coming into operation automatically when it is most needed, when turning a sharp corner. The advantages of a lamp capable of being automatically rotated and dipped may be further emphasized by providing the lamp with filaments which are able alternatively to cause a wide or narrow angle beam to be projected, switch means being provided for changing from the narrow to the wide beam whenever the steering mechanism is turned through a predetermined angle from a central or median position.

According to a further aspect of the invention there is provided a vehicle lamp mounting comprising a mounting member adapted to be fixed to a vehicle, means for mounting a lamp on the mounting member, such means including a pivotable lamp support, a linkage for connecting the lamp support to the vehicle steering mechanism whereby the lamp support is pivotable about its substantially vertical axis in response to steering movement of the steering mechanism, and means for tilting the lamp support axis in response to rotational movements of the lamp support thereabout.

In one embodiment of the invention a lost motion connection is provided in the linkage for connecting the lamp support to a vehicle steering mechanism whereby the rotational movement of the support is not directly proportional to movements of the steering mechanism. Suitably the lost motion connection may comprise a pivotal lever adapted to be connected for pivotal movement by the linkage, a pin and slot connection being provided between one end of the lever and an arm on the support extending away from the support axis.

Suitable cam means may be provided for tilting the support axis in response to rotational movements of the support, the cam means being operable to displace the support axis substantially horizontally to tilt the support axis about a lamp suspension point remote from the cam means. In a particularly convenient embodiment of the invention the mounting member comprises an open fronted box provided with slots at its top and bottom. The lamp support comprises a pin received in one of these slots whilst a lamp suspension piece is received in the other slot whereby a lamp is supported between the lamp suspension piece and the lamp support. This arrangement is particularly convenient since the pin of the lamp support can be made movable back and forth in its slot for varying the dipping of the lamp during rotational movements of the lamp whilst the suspension piece can be movable back and forth in its slot for adjusting the initial angle of dip when setting the lamp upon the vehicle.

In a particular simple arrangement the support may comprise a substantially horizontally extending arm and the cam means may comprise a projection from said arm engaging a cam surface on the mounting member, this cam surface extending transversely of the direction of tilting movement of the support axis. In an alternative simple arrangement the cam may be mounted directly upon the support pin and be urged against a portion of the support member by a spring. The portion of the support member engaged by the cam thus comprises a stationary cam follower so that the support pin is moved back and forth by the action of the cam during rotational movement thereof so as to vary the angle of dipping of the lamp. Preferably the linkage may comprise a drive rod pivotally connected to the support arm whereby longitudinal movement of the drive rod causes pivoting rotational movement of the support. Suitably the drive rod may be adapted to be mounted for movement transversely of the vehicle and a driving connection to the drive rod be adapted to be secured to the track rod of a vehicle steering mechanism. In one convenient embodiment the driving connection may include a drop arm connected at one end by a universal joint to one end of the link, the other end of the link being adapted to be pivotally connected to the vehicle steering track rod. The drop arm may be rigidly secured at one end to a spindle, the drive rod being connected to a second drop arm rigidly secured to the spindle. In order to prevent vibrational movement being transferred from the vehicle track rod it is desirable that the pivotal connection between the track rod and the other end of the link is aligned with the universal connection between the track rod and the end of a rack comprising a vehicle rack and pinion steering mechanism.

A still further aspect of the invention provides a vehicle lamp mounting comprising a mounting member adapted to be fixed to a vehicle and including a slot extending longitudinally of the vehicle, a lamp suspension piece received in said slot and adapted to have a lamp secured thereto, and means for connecting said suspension piece with a vehicle suspension whereby variation in loading or attitude of the vehicle causes movement of the suspension piece in the slot to change the angle of projection of a beam from the lamp. Whereas this aspect of the invention is particularly useful when combined with a rotating dipping lamp mounting it is also of use for controlling the angle of projection of beams from non-rotatable lamps. Thus this aspect of the invention provides particularly simple means by which the lamps may be made self-levelling when a vehicle is heavily loaded at its front or rear end to change its attitude in respect of the road, or when similar changes in attitude occur due to the transfer of weight between the front and rear wheels of a vehicle during travel of the vehicle up or down a hill.

The preferred means for connecting the suspension piece to the vehicle suspension comprises a Bowden cable, means being provided for equalizing variation of the suspension on either side of the vehicle. Suitably the Bowden cable may lead to a junction box adapted to be secured to the vehicle and provided with further cables for connection to the vehicle suspension at either side of the vehicle, the equalizing means comprising spring connections provided between the cable connected to the suspension piece and each of the cables adapted to be connected to the vehicle suspension.

A further advantageous adaption of the invention enables the angle of dip or projection of the beam to be adjusted from the car dashboard. This is of particular use in enabling a driver to take into account variations in vehicle attitude. Thus if a car is heavily loaded at the rear end of the angle of projection of the beam can be varied so that the beam is not projected upwards but is projected at the usual required angle relative to the ground despite the change in vehicle attitude. Basically this adaption comprises a connecting linkage from the vehicle dashboard to the lamp mounting whereby adjustment of a screw on the dashboard causes forward or rearward movement of the top or bottom of a lamp so as to change the vertical angle of projection of a beam from the lamp.

The preferred means for connecting the suspension piece to the means under the control of a driver comprises piano wire provided with a flexible tubular casing which gives a particularly accurate linkage. When lamp mountings according to the present invention are provided on both sides of a vehicle as the vehicle headlights it is preferred that the linkage to the suspension piece for the means under the control of the driver should be such that the near side lamp starts moving slightly before the off side lamp when the driver starts moving the lamp from their fully downwardly deflected or dipped position.

The invention also provides, in another aspect, a lamp mounting comprising a housing and lamp support means at the top and bottom of the housing, one of said lamp support means comprising a pin carried by a slide movable longitudinally of the housing whereby in a forwardmost position the pin carrying portion of the slide projects from the housing, a spring bias being provided normally holding the pin in a lamp engaging position whereby in the forwardmost position of the slide the pin is retractable from the lamp against the bias to release the lamp for removal from the housing, the housing including means for preventing retraction of the pin when the slide is moved from its forwardmost position. Preferably the means for preventing retraction is an abutment surface of the housing and manually operable means may be provided for controlling the position of the slide longitudinally of the housing. Suitably the pin may be a pivot pin mounted for sliding movement against a spring bias in a bore through the slide.

Conveniently the other of the lamp suport means may comprise a rotatable drive pin having a driving connection for rotatably driving a lamp carried by the housing. The drive pin may be mounted for sliding movement perpendicular to its axis against a spring bias in a slot longitudinally of the housing and preferably cam means are provided for causing this rearward sliding movement as a function of rotational movement of a lamp from a median position. In order to provide a positive engagement the drive pin is preferably receivable in a socket in the lamp with the driving connection comprising a member projecting perpendicular to the axis of the drive pin and engageable in V-shaped recesses to either side of the socket in the lamp.

The invention will further be described, merely by way of example, with reference to the accompanying drawings, in which:

FIGURE 1 is a diagrammatic fragmentary plan view from the bottom showing the linkage between a mounting device according to the present invention and the steering mechanism of a vehicle;

FIGURE 2 is an enlarged diagrammatic view of a safety member included in the linkage shown in FIGURE 1;

FIGURE 3 is a diagrammatic sectional view of the device of the present invention;

FIGURE 4 is an enlarged front perspective view of the mounting tube of the device shown in FIGURE 3;

FIGURE 5 is a front perspective view of an inner supporting tube adapted to be mounted within the tube shown in FIGURE 4;

FIGURE 6 is a perspective view of a support disc adapted to be mounted in the upper end of the tube shown in FIGURE 5;

FIGURE 7 is a fragmentary sectional view showing the support disc mounted in the inner tube;

FIGURE 10 is a plan view of part of the drive arrangement for connecting the device of FIGURE 8 to the steering mechanism of a vehicle;

FIGURE 11 is an elevational view of the arrangement of FIGURE 10;

FIGURE 12 is an enlarged sectional view taken along the line 12—12 of FIGURE 10;

FIGURE 13 is a circuit diagram showing the arrangement of suitable switching means for controlling a lamp mounted upon the device of the present invention;

FIGURE 14 is a diagrammatic perspective view from the rear of a further embodiment of lamp mounting embodying the invention;

FIGURE 18 is a detail view of one form of lamp suspension piece which may be provided in the lamp mounting of FIGURE 14;

FIGURE 19 is a view similar to FIGURE 18 but showing an alternative form of lamp suspension which may be used to control the angle of the lamp in accordance with vehicle attitude;

FIGURE 20 is a diagrammatic view of a cable arrangement suitable for connection to the suspension unit shown in FIGURE 19;

FIGURE 21 is a diagrammatic plan view of a dash-operated dipping control arrangement;

FIGURE 22 is a diagrammatic perspective view of a lamp mounting according to the invention incorporated in the left hand front wing of a car and illustrating the connecting linkage to the car steering mechanism;

FIGURE 25 is an elevational view of part of the linkage for connecting the track rod to the lamp mounting;

FIGURE 26 is a view of a detail taken in the direction of the arrow XXV in FIGURE 4;

FIGURE 27 is a plan view of mechanism for mounting in the interior of a motor vehicle for putting the angle of dip of the lamp under the direct control of the vehicle driver;

FIGURE 28 is a sectional view taken along the lines XXVII—XXVII of FIGURE 27;

FIGURE 29 is a graphical representation of the relationship between wheel deflection and lamp rotation and angle of dip in a typical embodiment of the invention;

Figure 8:
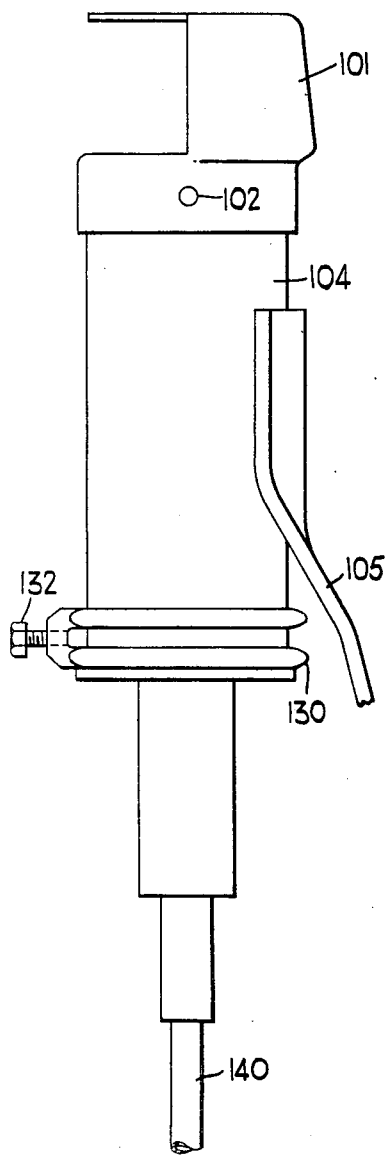
FIGURE 8 is a side view of a further embodiment of lamp mounting device according to the present invention.

Referring to the drawings, in FIGURE 3 the lamp mounting device of the present invention is shown as comprising a lamp support 1 in the form of a disc hinged within the upper end of a supporting member comprising a first tube 3. A hinge pin 2 secured to the disc 1 is received in hinge holes 18 in the top of tube 3. The first tube 3 is rotatably mounted within a mounting member comprising a second, outer, tube 4. The tube 4 is adapted to be connected, as by a band clamp 5, to a structural member 6 at the front of a vehicle.

A lamp 7 is detachably mounted in the support disc 1 by a bolt or similar means, a spring 8 being provided for drawing the support disc 1 down so that a follower portion 9 integrally formed on the support disc is held in engagement with a cam surface 10 on the outer mounting tube 4.

As shown in FIGURE 4 the cam surface 10 is provided with a peak 11 and slopes down on either side therefrom. The cam follower 9 on the disc 1 projects through a slot 12 in the first tube 3, such slot being shown in FIGURE 5.

Referring to FIGURE 1, a linkage between the steering rod 13 of a vehicle and the device is shown as comprising a bracket 14 securely fastened to the steering rod and having a pivot at its outer end. A lever 15 is secured to the lower end of the inner tube 3, as by a welded nut 16 (FIGURE 5), the ends of the bracket 14 and lever 15 being pivoted to a connecting safety member 17. With this arrangement, as the steering rod 13 is displaced from side to side during steering of the vehicle, the lever 15 is pivoted so as to rotate the tube 3 in response to movements of the steering mechanism.

In order to ensure that the steering mechanism cannot be held against movement should the device of the present invention be caused to jam, the safety member 17 is constructed so as to be incapable of transmitting a force greater than a predetermined value.

A particular embodiment of safety member is illustrated in FIGURE 2 as comprising a rod 19 slidably received in a tube 20, the remote ends of the rod and tube being provided with pivots 21 and 22 for connection to the bracket 14 and lever 15. In the construction illustrated in FIGURE 2 a spring loaded pin 23 is shown engaging through the tube 20 into a recess in the rod 19. With this construction should the predetermined force be exceeded the pin 23 is cammed out of the recess in the rod so that the rod 19 and tube 20 may be movable relative to each other. A detent (not shown) may be provided for holding the pin 23 in its retracted position so that once the pin has been retracted from the recess it cannot again engage the recess until the detent has been released. This helps to ensure that too much wear on the pin and recess would not take place were the vehicle to be driven for any length of time with the lamp mounting device jammed against rotation.

Instead of the spring loaded pin device shown in FIGURE 2 similar safety features may be achieved by having a screw threaded through the tube 20 to engage the rod 19.

A Bowden cable or similar release may be provided on the pin 23 or equivalent screw so that the mechanism is releasable at the will of the driver. This permits the device to be disconnected from the steering mechanism when the lamp is not in use.

In order to prevent there being any possibility of misleading an oncoming driver should the vehicle be reversed it is preferred for a switch controlled by the gears of the vehicle to be provided in the lamp circuit whereby the lamp is automatically switched off whenever reverse gear is engaged.

Conveniently the mounting device may be attached near the offside of the front of a vehicle with the lamp directed to an angle of about 5 to 7° inwardly of the longitudinal axis of the vehicle when in a median position with the cam follower 9 engaging the peak 11 of the cam surface 10. With this arrangement it is ensured that the lamp commences to tilt downwardly and be dipped before it is directed in a direction to the offside of the vehicle axis. Instead of the flat follower illustrated a roller or other follower having a quick response at the peak of the cam surface may be provided. It is, however, preferred that the cam follower should have a flat cam engaging surface or that the peak of the cam surface should be flattened slightly so that the lamp is not dipped for small movements of the steering mechanism on either side of dead centre. Naturally the linkage between the lamp mounting device and the steering mechanism should be adjustable or otherwise adaptable for mounting on a variety of different vehicles. Preferably the linkage is such that the lamp turns through a greater angle than the angle turned by the wheels of the vehicle. This exaggerates the action of the lamp so as to emphasize its usefulness when the vehicle is driven around acute bends.

Figure 9:
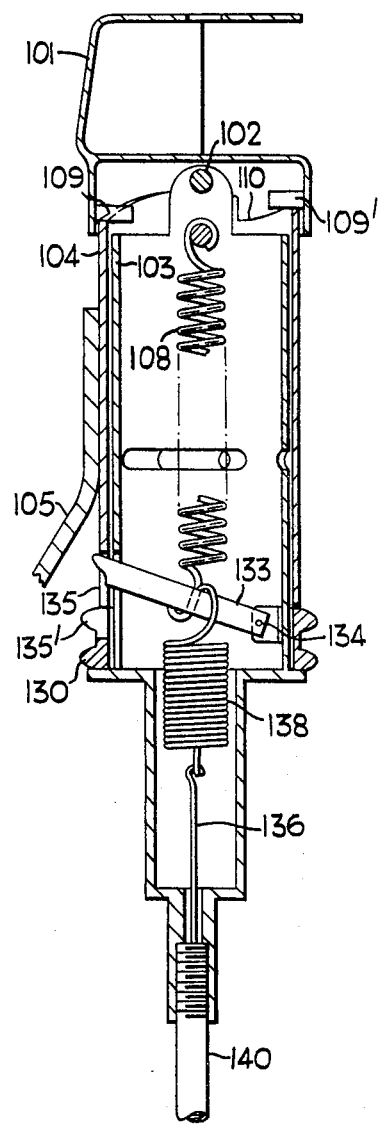
FIGURE 9 is a longitudinal sectional view of the device of FIGURE 8.

A further embodiment of the invention is shown in FIGURES 8 and 9 where a support 101, adapted to have a lamp fixed thereto, is hinged by a pin 102 to a tubular supporting member 103. Surrounding the tube 103 is a tubular mounting member 104 adapted to be secured by a mounting bracket 105 to a vehicle with which the device is to be used. Cam surfaces 110 are provided to the front and to the rear of the upper edge of the tubular mounting member 104, these cam surfaces being engaged by followers 109 and 109' projecting inwardly from a skirt portion of the support 101, this skirt portion enabling the support 101 to fit as a cap over the top of the mounting and support members 104 and 103. Mounted about the tube 103 beneath the tube 104 is a pulley 130 which is freely rotatable in respect of both tubes 103 and 104.

A clutch mechanism is provided for selectively coupling the pulley 130 with the supporting member 103. When this clutch mechanism is engaged rotation of the pulley 130 causes rotation of tube 103 with consequent rotation of the lamp support 101.

The clutch mechanism comprises a lever 133 pivoted at 134 to the inside of the tube 103 and normally urged upwardly by a spring 108. A slot 135 is provided in the tube 104 for receiving a projecting end of the lever 133 in the clutch disengaged position shown in FIGURE 9. An operating sleeved cable 140 having a core wire 136 is connected via a spring 138 with the lever 133 so that upon tension being applied to the core wire 136 the lever can be pivoted downwardly to engage a slot 135' in the pulley 130 and thus to provide a driving connection between the pulley 130 and the tube 103. The spring 138 is provided in case the lever 133 should not be aligned with the slot 135' upon tensioning of the core wire 136. Thus in such circumstances the spring 138 would be tensioned and would urge the lever 133 downwardly until such time that the pulley 130 has been rotated so as to bring the slot 135' into a position where it can receive the lever 133.

A screw 132 is provided on the pulley 130 for the positive clamping of an operating cable to the pulley. Such an operating cable can then transmit a drive from a vehicle steering mechanism to the pulley 130.

It should be noted that the hinge pin 102 is not essential. Thus, providing that some connection is provided preventing relative rotation of the tube 103 and the support 101, the support 101 can simply be held down with followers engaging the cam surface at the front and rear of the tube 104 by a spring action. Thus instead of the spring 108 engaging a member fixed to the tube 103 it could engage a portion of the support 101 to hold the support downwardly with the cam followers engaging the cam surfaces at the front and rear of the tube 104.

FIGURES 10, 11 and 12 show a suitable arrangement for connecting a vehicle steering mechanism to a drive for connection by means of a cable to the pulley 130 of the device shown in FIGURES 8 and 9. As shown in the drawings this arrangement comprises an angle bracket 160 having a pin 162 upstanding from its lower flange. Mounted for rotation on this pin 162 are a lever 148 and a pulley 146. The lever 148 engages a pin 152 upstanding from a vehicle track rod 150 by means of a slot 154.

Naturally any other suitable means may be used for directly connecting the lever 148 with the vehicle steering mechanism.

A cable drive is provided from the pulley 146 by means of a sleeved cable 142 having a core wire 144. The ends of the core wire 144 are clamped to the pulley 146 by means of a clamping screw 156. It will be seen that with this arrangement reciprocation of a vehicle track rod 150 causes the lever 148 to rotate about pivot 162 and cause rotation of the pulley 146, this rotation being transmitted to the pulley 130 of the device of FIGURES 8 and 9 by means of the core wire 144 of the sleeved cable 142.

Means are provided for limiting the torque which can be transmitted from the lever 148 to the pulley 146 so that should, for any reason, the lamp support device be jammed in one position there would be no interference with the normal steering of the vehicle. This torque limiting device comprises balls 158 mounted in bores in a boss portion of the lever 148 so as to project radially outwardly into engagement with recesses in an inner surface of the pulley 146. When the predetermined torque is exceeded the balls 158 are cammed inwardly to disengage the recesses in the pulley 146 and thus to release the connection between the lever 148 and the pulley 146.

A further development of the invention is also shown in FIGURES 10 to 12 where a switching bar 164 is shown urged downwardly by a spring 172 into engagement with cams 170 on the upper surface of the pulley 146. The switching bar 164 is pivoted to the mounting bracket 160 by a pivot 166 and is provided at its free end with an electrical contact engageable with a further switching contact 168. The switching contacts are arranged to be closed by the action of the cams 170 whenever the pulley 146 has rotated through a predetermined angle from its central position. The switching contacts can be connected with the power source to a lamp mounted on the support 101 so that the lamp is automatically switched on whenever the steering mechanism of a vehicle carrying the device is turned through more than a predetermined angle.

Preferably with this arrangement a further switch is provided so that a driver can decide whether the lamp is to be switched on continuously, whether the lamp is to be controlled by movement of the switching bar 164 so as only to come on when the steering mechanism is turned through a predetermined angle, or whether the lamp is not to be used at all.

Although only one set of switching contacts are shown in the arrangement of FIGURES 10 to 12 it will be appreciated that other switches can be controlled by rotation of the pulley 146 as required. Thus it is envisaged that a connection may be provided between such switches to the normal headlights of a vehicle so that these are dipped automatically whenever the steering is turned through more than a predetermined angle or that the lamp mounted on the bracket 101 may be provided with two filaments which may be alternatively illuminated to give either a narrow or a wide beam. This latter arrangement may be such that whenever the steering is turned through more than a predetermined angle the wide beam comes into use whilst when the steering is substantially straight ahead the narrow beam is in use.

FIGURE 13 shows a simplified diagram of an electrical circuit suitable for use with these latter described arrangements. Referring to this diagram a switch 200 is shown for switching on or off the main headlights of the vehicle. These main headlights comprise a main beam filament $m$ and a dipped beam filament $d$. These filaments are connected, via an overriding dipping control ODC, to earth to complete a circuit. Also connected to the filaments $m$ and $d$ are switching contacts 205 and 206 which connect in an auto dipping switch 207 to the overriding dipping control ODC. By controlling the contacts 205 and 206 in response to movements of the steering mechanism, as by a switching bar 164 as shown in FIGURES 10 to 12, the headlights can be caused automatically to dip whenever the steering mechanism of the vehicle is turned through more than a certain predetermined angle. The arrangement is such that even when the driver has the auto dipping switch 207 closed he is still able, by means of the overriding dipping control ODC, to dip the headlights when they are on the main beam to avoid dazzling the driver of an oncoming vehicle.

The lamp to be mounted on support 101 is provided with two filaments, a filament $w$ for causing the projection of a wide angle beam and a filament $n$ for causing the projection of a narrow beam. The filaments $w$ and $n$ are alternatively connectable by means of contacts 203 and 202 with a line 210. Two leads are connected in parallel from line 210 to earth, one lead containing a switch 209, and the other lead containing a switch 204 and a switch 208. The switches 208 and 209 are linked so that when switch 208 is closed switch 209 is open and vice versa. When switch 209 is closed the spot lamp is permanently switched on whatever the condition of the steering mechanism whilst when the switch 208 is closed the lamp is only switched on when the steering mechanism has been turned through a predetermined angle such as to close a switch 204.

Two further switches 201 and 211 are shown in FIGURE 13, one of these switches is connected to the vehicle reversing gear so that whenever the vehicle is put into reverse the spot lamp is switched off, whilst the other is a normal overriding on-off switch which is closed only when the clutching device is operated by a driver to connect the spot lamp with the steering mechanism. It will be readily apparent that this more sophisticated switching mechanism is purely optional and may be developed as desired to accentuate the advantages obtainable by the provision on a vehicle of a lamp which is rotatable in response to movements of the vehicle steering mechanism and which is automatically dipped in accordance with the degree of rotation thereof.

There is shown in FIGURE 14 a lamp mounting comprising a box-like mounting member 310 adapted to be mounted on the front of a steerable vehicle and comprising a lower structural plate 311. A slot 312 is provided through the lower structural plate 311 and receives a pin 313 comprising part of a lamp support provided with a support arm 314. The support is generally pivotable about the axis of the pin 313, the pin 313 being positioned within the slot 312 by cam means comprising a pin 315 engaging a slot 316 extending transversely of the vehicle along the rear edge of the plate 311. The lower end of the pin 315 is pivotally secured to the end of the drive rod 317 whereby longitudinal movement of the drive rod transversely of the vehicle causes rotational movement of the support with consequent tilting of the axis of the pin due to movement of the pin 313 in slot 312. The drive rod 317 is provided with adjustment screw 318 for adjusting its length so as properly to position a lamp once the lamp mounting has been fitted to a vehicle.

During use of the mountings the drive rod 317 moves back and forth longitudinally in response to turning movement of the vehicle steering mechanism. This movement of the rod 317 causes rotational movement of the support, and turns the lamp, about the axis of pin 313. The pin 315 and slot 316 act as cam means causing the pin 313 to be moved along slot 312 in response to rotational movement of the support and then to lift the axis of the pin 313 and the lamps carried by the support. Instead of, or in addition to, the slot 316, the support may be provided with a spring pulling the support forwardly. With such an arrangement the rear edge of the plate 311 acts simply as a cam surface extending transversely of the vehicle, the pin 315 being held against this cam surface by the action of the spring. The shape of the rear edge of the plate 311 can be varied from a straight line as required to change the rate of dipping of the lamps in relation to movement of the rod 317.

The drive rod 317 is pivotally connected to the lower end of a drop arm 320 which is rigidly secured to one end of a spindle 321, to the other end of which is rigidly secured a drop arm 322. A link 324 is connected by a universal joint 323, preferably a ball joint, to the lower end of a drop arm 322. When the lamp mounting is positioned on a vehicle, the spindle 321 is secured for rotational movement relative to the vehicle whilst the end of the link 324 remote from the joint 323 is pivoted at 325 to the inner end of a track rod 326 of the vehicle steering mechanism. The linkage is such that a greater movement is transmitted to the drop arm 322 near the centralized portion of the steering than when the steering has been turned from the straight ahead position. A spring tensioner 319 is provided, as shown in FIGURE 14, for taking up any play in the linkage from the vehicle track rod 326 to the support arm 314.

A lamp 327, which may conveniently be a sealed beam unit, is mounted upon the support and is secured at its upper end to a suspension piece 328 which is received in a slot 329 provided in the top plate 320 of the box 310. Although, for the purposes of clarity, not shown in FIGURE 14, means are provided for adjusting the position of the suspension piece 328 along the slots 329 so that the angle of projection of the beam from the lamp 327 can be accurately adjusted once the lamp mounting is fitted on a vehicle. Suitable means will be later described in relation to FIGURES 18 and 19 of the drawings.

Figure 17:
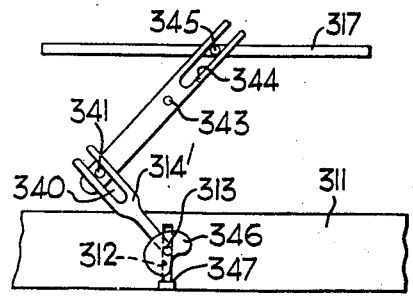
FIGURE 17 is a plan view of part of a modified construction of lamp mounting.

FIGURE 17 shows an alternative embodiment of the invention in which the support arm 314' is provided with a bifurcated end portion 340. Received in the slot formed by the bifurcated end portion 340 is a pin 341 mounted upon one end of a lever 342 pivoted at 343 by a pivot secured in fixed relation to the plate 311. The end of the lever 342 remote from the pin 341 is bifurcated at 344 to provide a slot receiving a pin 345. As will later be explained this particular connection provides lost motion whereby rotation of the support comprising the support arm 314' is not directly proportional to movement of the drive rod 317, and hence of the vehicle steering mechanism. With this embodiment a cam 346 is secured to the support and is urged into contact with a cam follower 347 fixed to the plate 311 by a spring, not shown. The cam 346 is provided for changing the position of the pin 313 along the slot 312 and thus to tilt the pivoting axis of the pin 313 in response to rotational movements of the support and hence of the cam 346.

FIGURE 18 shows a detail of the top mounting for lamp 327 by means of a suspension piece 328 received in a slot 329 in the upper plate 330 of the box 310. The suspension piece 328 is provided with an enlarged head supported on the plate 330 on either side of the slot 329. As shown in FIGURE 18 a projection 351 is provided at the forward edge of the plate 330, a tension spring 350 being mounted between the suspension piece 328 and the projection 351 so as to pull the suspension piece 328 forwardly. A projection 353 is provided near the rear edge of plate 330 and receives a screw 352 retained by a nut 354. With this arrangement adjustment of the screw 352 relative to this projection 353 positions the suspension piece 328 accurately along the length of the slot 329.

Figure 16:
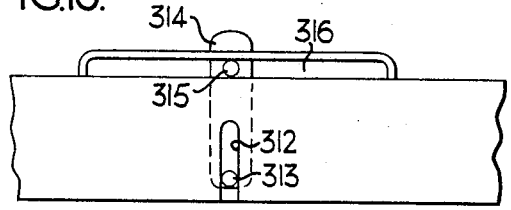
FIGURE 16 is a detail bottom view of part of the lamp mounting of FIGURE 14.

When the described lamp mounting is fitted to a car or other vehicle the angle of dip of the lamp 327 is initially set to the required angle of dip in the central position of the lamp by positioning the suspension piece 328 within the slot 329. Similarly the adjustment screw 318 in the drive rod 317 is adjusted to ensure the correct projection angle of the lamp 327 in association with the steering mechanism of the vehicle. Subsequently when the steering mechanism of the vehicle is moved, the movement is transmitted from the track rod 326 to the drive rod 317 and thence to the support arm 314 to rotate the lamp support and lamp 327 about the axis of pin 313. Action of the cam 346, with the embodiment of FIGURE 17, or pin pin 315 in the slot 316 in the embodiment of FIGURES 14 and 16 causes the pin 313 to be displaced rearwardly in the slot 312 towards the slot 316 so as to cause the axis of the pin 313 to be tilted about the suspension piece 328 to cause dipping of the lamp.

The arrangement of FIGURE 17 is advantageous in that the rotation of the support arm 314', and hence of the lamp, is not directly proportioned to movement of the drive rod 317. Because of the longer lever arm between pin 341 and pivot 343 than between pin 345 and pivot pin 343, initially, when the arm 314' is centrally positioned, the lamp is moved through a greater angle than the vehicle steering. However, as the vehicle steering mechanism is turned through an increasing angle the resulting movement of the support arm 314' is reduced until, in the position shown in FIGURE 17, movement of the drive rod 317 causes very little movement of the arm 314', the pin 341 merely sliding along the slot 340. The pin 341 and slot 340 thus provide a lost motion connection between the drive rod 317 and the support arm 314'.

Figure 15:
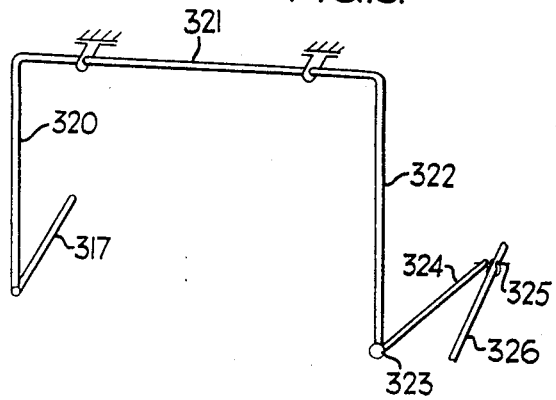
FIGURE 15 is a diagrammatic view to a reduced scale of part of a linkage for connecting the lamp mounting of FIGURE 14 to a vehicle track rod.

The linkage shown in FIGURE 15 is particularly advantageous since it can be mounted in the wing of a car with the spindle 321 spanning a front wheel of the car and with the ball joint and pivot linkage acting to prevent small movements and vibrations in the track rod 326, due to passage of the vehicle over bumps in the road affecting the direction of the beam emitted from the lamp 327.

FIGURE 19 shows a modified connection to the suspension piece 328 whereby the angle of dip of the lamp 327 can be varied in accordance with vehicle attitude. In this arrangement instead of the screw 352 and nut 354 a Bowden cable 360 is secured to the projection 353 with the core 362 of the cable being connected to the suspension piece 328. Initial positioning of the lamp can be obtained by adjustment of a screw 361.

The end of the cable 360 remote from the suspension piece 328 is, as shown in FIGURE 20, connected to a junction box 364 which, during use of the device, is secured to the vehicle frame or chassis. The outer casings of two further Bowden cables 365 and 366 are connected to either side of the junction box 364, the ends of these further cables 365 and 366 being connected to the vehicle frame or chassis near the front suspension of the vehicle. The inner core of the cables 365 and 366 is connected to the vehicle suspension at one end whilst at the other end they are connected by springs 367 and 368 to the core 362 of the cable 360. This device acts so that when the suspension moves relative to the vehicle frame or chassis this movement is transmitted via the cables to the suspension piece 328 to change the angle of projection of the lamp. In order to equalise variations in position of suspension on either side of the vehicle, in particular when one wheel passes over a bump or into a dip, the springs 367 and 368 serve to prevent such movements being transmitted to the cable 360. Thus with such quick movements of the suspension the movements are absorbed by the springs 367 and 368 rather than being transmitted to the core 362 of the cable 360.

Whilst the cable 360 is shown attached to the rear of the lamp mounting box, it will be appreciated that whether it is attached to the rear or the front depends upon particular connection between the ends of the cables 365 and 366 to the suspension. Thus if the cables 365 and 366 are so connected to the suspension that the core moves into the cable casing upon an increase in load at the front of the vehicle it is necessary for the cable 360 to be mounted at the front of the lamp so as to allow the suspension piece 328 to move rearwardly in the slot 329, whilst if the cables 365 and 366 are so connected to the vehicle that the cable core moves outwardly of the cable casing upon an increase in load at the front of the vehicle and consequent increased deflection of the suspension, then the cable 360 can be attached to the rear of the lamp mounting box 310 as shown in FIGURE 19.

In general it should be appreciated that whereas the lamp mounting of the present invention has been described as an auxiliary or accessory device for mounting on a vehicle it can be included in a vehicle as original equipment. Thus it is possible, whilst still using the principles of the present invention, to incorporate an automatically rotating and dipping light connected to the steering mechanism of a vehicle as the headlights or main lights of the vehicle. Furthermore, although in the majority of cases the lamp 327 will in itself be separate from the lamp support 312, it is possible for the lamp itself to incorporate the support 312 and the suspension piece 328. Similarly the suspension piece 328 and the support 312 may be connected only by the lamp supported thereby although in some instances it may be desirable to provide a connecting mounting frame adapted to have the lamp secured thereto.

Suitably also the front of the box 310 may be provided with a sealing cover of perspex or glass to prevent dirt and other foreign matter entering the moving parts of the lamp mounting. It will be appreciated that it is readily possible to seal the whole box 310 merely leaving small apertures for allowing electrical wiring, the drive rod 317, and, where fitted, the Bowden cable 360 to pass into the mounting box 310.

FIGURE 21 shows an arrangement for modifying the embodiments of FIGURES 18 and 19 whereby the angle of dipping of the lamp can be adjusted from the car dash-board. Basically this modification comprises replacing the projection 353 fixed to the upper plate 330 of the box 310 by a projection 353' mounted for movement upon the end of a lever 370 pivoted at 371 to the box upper plate 330. The end of the lever 370 remote from projection 353' is removed via a spring 373 to part 372 of the car radiator grill and is also connected to the core wire 374 of a Bowden cable 375. The remote end of the cable 375 carries a nut 379 mounted in the car dash-board 376, a threaded spindle 377 is received by nut 379 and is connected to the core wire 374. A knurled knob 378 is secured to the spindle 377.

During use of this modification a car driver, by rotating knob 378, can cause movement of the lever 370 and thus of the projections 353' and suspension piece 328 to change the angle of dips of the lamp mounted in the box. This embodiment is of particular use where the attitude of the car changes successively when the car is heavily loaded. Thus, frequently when a light car is heavily loaded at the rear the lights are caused to project upwardly by an unacceptable amount. This aspect of the invention enables a driver readily to change the angle of dipping or projection of his lights to take into account changes in vehicle attitude. Although of particular use with rotating and dipping lamps coupled with the vehicle suspension the arrangement is also of use in conventional headlights or lamps of the non-rotatable type.

Referring now in greater detail to the drawings, FIGURE 22 shows part of a car or other road vehicle comprising a wing 401 having a wheel 402 mounted thereunder. The steering mechanism for the wheel includes a track rod 403 adapted to be connected to one end of the rack of a conventional rack and pinion steering mechanism. The rack, not shown in FIGURE 22, is illustrated at 404 in FIGURE 24.

The lamp mounting is shown in FIGURE 22 as comprising a mounting member 405 having therein a support member 406 comprising a downwardly extending pin 407. The support member 406 is, as shown in FIGURE 23, adapted to support a vehicle lamp 425.

The support 406 comprises a downwardly extending support pin 407 from which a lever 408 extends rearwardly. A slot 410 extending lengthwise of the lever 408 is engaged by a pin 407 extending downwardly from a lever 411 pivoted at 412 to the mounting member 405. A drive rod 413 extending transversely of the vehicle has one end pivoted at 414 to the lever 411 and has the other mounted by a universal joint 415 to the lower end of a drop arm 416. The upper end of the drop arm 416 is welded or otherwise suitably secured to a spindle 417 mounted for rotation in brackets 418, the brackets 418 being secured to the vehicle. At the rearward end of the spindle 417 a further drop arm 419 extends downwardly with its lower end pivoted at 421 to one end of a link 420, the other end of the link 420 is pivoted by a pin 422 to a member 423 which is clamped at 424 to the track rod 403.

It will be appreciated that with the arrangement shown in FIGURE 22 movement of the track rod 403 to the left to cause the car to turn to the right will cause corresponding movement to the left of the drive rod 413. Movement of the drive rod 413 to the left then causes rotational movement of the support pin 407 so that the lamp is directed to the right. In the linkage shown in broken lines in FIGURE 22 and including the members 413', 414', 415', 416', 419', 420', 421', 422', 423', 424' and 403' an alternative arrangement is shown which is suitable for use in cars where the track rod 403' is located forwardly of the vehicle wheel axis instead of rearwardly thereof as is the track rod 403. With the arrangement shown in broken lines movement of the track rod 403' to the right will be necessary to cause the lamp support member 406 to turn to the right.

Figure 23:
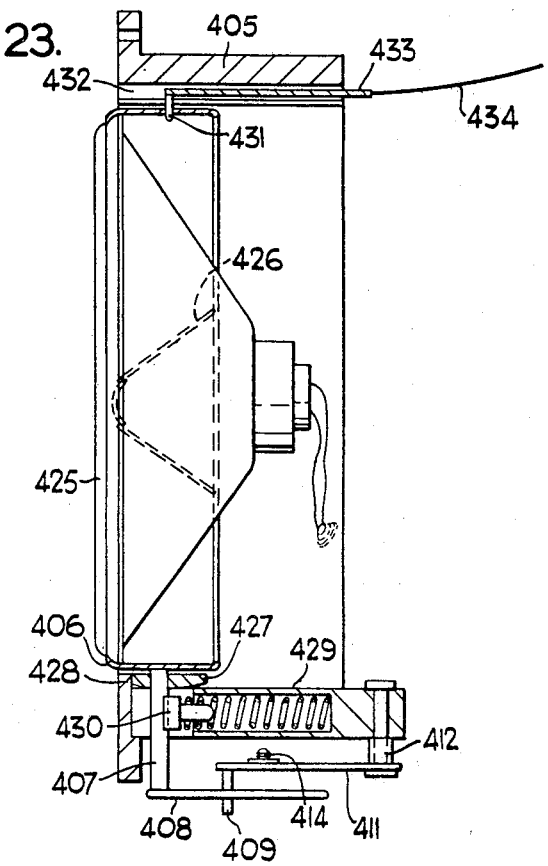
FIGURE 23 is a sectional view of the lamp mounting.

FIGURE 23 shows more fully the actual lamp mounting wherein the lamp 425 is held in a support member 406 by means of a W-clip 426. A circular cam 427 is secured about the support pin 407 and engages a fixed follower portion 428 of the mounting member 405. The cam 427 is urged against the follower portion 428 by the action of a compression spring 429 mounted within a bore in the lower end of the mounting member 405 and engaging a pad 430 which in turn engages the support pin 407 to urge the support pin 407 forwardly. The support pin 407 projects downwardly through a slot extending axially of the mounting member 405 so that upon rotation of the support pin 407 the cam member 427 causes the support pin 407 to move backwards and forwards in the slot.

The upper end of the support member 406 is secured to a suspension piece 431 received in a groove 432 at the top of the mounting member 405. The support piece 431 is positioned longitudinally of the groove 432 by means of a rigid connector 433 connected to the end of a length of piano wire 434, the connector 433 being axially slidable within the groove 432. It will be appreciated from FIGURE 23 that the mounting member 405 is substantially cylindrical in shape and is so designed that it can be readily fabricated by moulding from plastics material, the housing member 405 being in the form of an open fronted cylindrical box.

Figure 24:
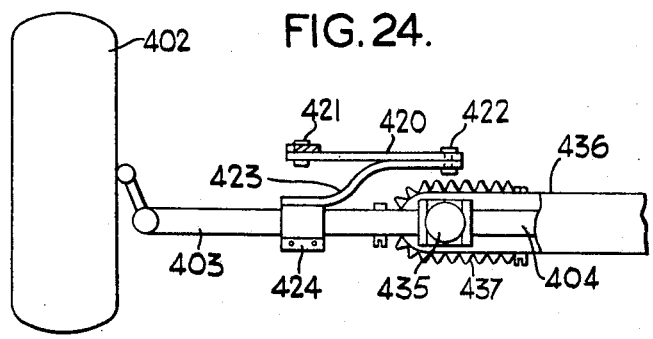
FIGURE 24 is a diagrammatic plan view showing the connection of the linkage adapted to control the lamp mounting to the track rod of the car.

Referring to FIGURE 24, the vehicle track rod 403 is illustrated as being connected by a universal joint 435 to one end of a rack 404 of a vehicle rack and pinion steering mechanism. The rack 404 is axially movable transversely of the vehicle within a housing 436, a protection sleeve 437 being provided between the track rod 403 and the housing 436 so as to keep dirt and foreign matter away from the universal joint 435 and the interior of the housing 436. As shown in FIGURE 24 it is most important that the pin 422 connecting the link 420 with the member 423 should be axially aligned with the universal joint 435 so as to preclude vibration of the track rod 403 due to the wheels 402 passing over bumps being transmitted to the link 420. Since the universal joint 435 is only rectilinearly movable in relation to housing 436 the pin 422 similarly transmits to the link 420 movements due substantially solely to the transverse steering movements of the track rod 403.

In order to provide a fail safe mechanism in case of jamming the pins 422 and 409 are preferably shear pins which will break if excessive strains are applied thereto.

FIGURE 26 shows a detail of FIGURE 25 whereby a limited universal movement is provided by a joint 415 between the drop arm 416 and the drive rod 413.

It will be appreciated that the above described arrangement, although described in relation to a lamp mounted at one side of a vehicle, can readily be duplicated so that the headlights on both sides of the vehicle are controlled from the steering mechanism.

Reverting to FIGURE 23 the piano wire 434 there-shown passes to means illustrated in FIGURES 27 and 28 under the direct control of a vehicle driver whereby the dipping of the lamp can be controlled directly in addition to the automatic dipping function provided by the rotation of the lamps.

FIGURE 27 shows a bar 438 which is adapted to be mounted behind the dash of a vehicle to which the mechanism of the present invention is applied. The bar 438 is rotationally supported by brackets 440 and extends substantially transversely of the vehicle. A manually operable member 439 is secured near one end of the bar 438 and extends therefrom to a position adjacent the steering wheel of a vehicle to which the device is fitted. The steering wheel is not, of course, shown in FIGURE 27 as it does not comprise part of the present invention. A bracket 441 is secured to the bar 438 so as to be upstanding therefrom and carries a bar 442 extending generally parallel with the bar 438. Screws 443 are provided for clamping the ends of two lengths of piano wire 434a and 434b. The other ends of the length of piano wire 434a and 434b are connected respectively to the right hand (off side) and left hand (near side) lamps of the vehicle so that rotation of the bar 438 by action of the lever 439 will cause corresponding movement of the suspension piece 431 in the groove 432 so as to alter the angle of dipping of the head lamps. It will be appreciated that in order to get proper transmission of movement by the piano wires 434 a casing, not shown, will be provided about the piano wires, one end of the casing being secured to the mounting member 405 and the other being secured to a fixed portion of the vehicle near the bracket 441 so that movement of the lamps is reliably controlled by operation of the lever 439. Also shown in FIGURE 27 mounted upon the vehicle facia panel 444 is a knob 445 controlling a stop member 446. A driver, by controlling the position of the stop 446 can limit rearward movement of the bracket 441 which is engageable with the end of the stop 446. This enables a driver to set the maximum upward movement permitted for his headlamps in accordance with the loading of the vehicle. Thus if the rear of the vehicle is heavily loaded so that the lights would tend to be directed upwardly, by screwing in the stop 446 he makes sure that the lamps cannot be raised beyond an upper safe limit in accordance with the loaded condition of his vehicle. Suitably the knob 445 may be graduated so as to give some indication to a driver of the approximate setting of the knob required for any particular loaded condition of the vehicle.

In order to obtain proper and efficient use of headlights it is important that the proper relationship should be provided between the angle of the steerable wheels in relation to the longitudinal axis of the vehicle and the degree of rotation of the lamp and the angle of dip of the lamp. Thus it has been found that the lamp should rotate through an angle greater than the angle of the wheels for small deflections of the wheels, i.e. for small steering movements, but that as the amount of steering increases the rate of lamp rotation should decrease additionally it has been found that although the lamp should start dipping immediately upon any movement of the vehicle wheels from their median straight forward position continued dipping is not required through the entire steering movement. Accordingly, FIGURE 29 illustrates graphically a relation between lamp rotation and angle of dip and wheel angle which has been found to be particularly advantageous for one embodiment of the invention on a car having a relatively short wheel base. Referring to FIGURE 29, the line A illustrates the relationship between lamp rotation and the angle of steering of the vehicle wheels. It will be noted that the line A shows that at the start the lamp is rotated approximately twice as quickly as the vehicle wheels but that this rate of rotation decreases so that at the limit of wheel rotation, 44°, the lamp also has rotated through 44°. The line B in FIGURE 29 shows the angle of dip of the lamp to be proportional to the angle through which the wheels of the vehicle have been turned through an initial steering action, but once the steering has been turned through a predetermined amount, 32° in the example illustrated, no further dipping of the lamp is obtained as shown by the line C.

The relationship illustrated by the line A is obtained by properly proportioning the linkage between the track rod 403 and the support pin 407. Most importantly the pin and slot connection 409, 410 between the lever 411 and the lever 408 provides a certain amount of lost motion whereby as the deflection of the lever 408 increases a greater incremental movement of the lever 411 is required to provide an incremental increase in the rotation of the support pin 407. This lost motion is due to the fact that as the lever 411 is pivoted further from its median position the pin 409 slides along the slot 410 away from the axis of the support pin 407. The relationship illustrated by the lines B and C is, of course, readily obtainable simply by appropriate shaping of the cam 427.

In general it will be appreciated that the above described construction provides a headlight arrangement whereby the headlamps automatically dip and rotate with the action of the vehicle steering mechanism during normal operation whilst at the same time overriding control of the dip is provided for the driver of the vehicle whereby he can readily dip the vehicle lamps as required when meeting oncoming traffic or in fog or other adverse weather conditions.

Figure 30:
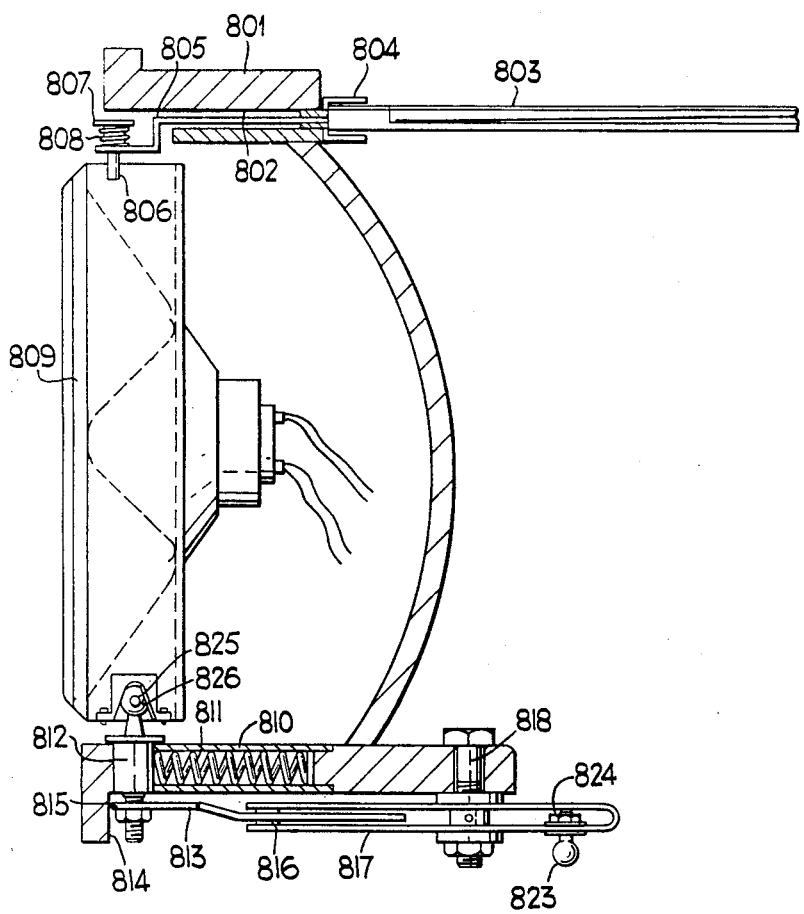
FIGURE 30 is a longitudinal sectional view of a further embodiment of lamp mounting according to the invention with a lamp mounted therein.
Figure 31:
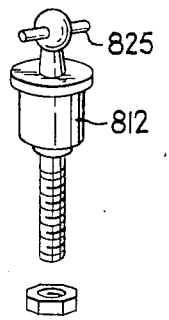
FIGURES 31, 32 and 33 are detail perspective views of parts of the mounting of FIGURE 30.
Figure 32:
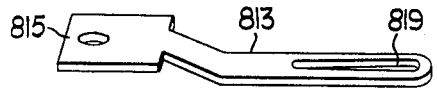
Figure 33:
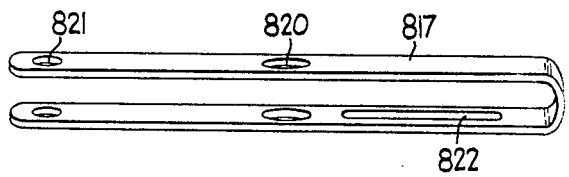

Referring to FIGURE 30 there is shown a lamp mounting comprising a housing 801 moulded from plastics material adapted to be mounted in the headlight nacelle of a motor vehicle. A lamp 809 is carried by the housing and is supported by diametrically opposed support means at the top and bottom of the housing. The support means at the top of the housing comprises a pivot pin 806 slidably received in a bore through a slide 805 and urged downwardly by a tension spring 808. The slide 805 is received in a passage 802 in the housing 801 and is movable longitudinally therein by means of a manually controlled cable 803 the outer cover of which is received by a cup 804 threaded into the rearward end of the passage 802. The cable 803 has a core wire connected to the rear of the slide 803 so that by movement of the core wire relative to the casing the slide 805 is movable longitudinally of the housing 801. In the forwardmost position of the slide a cap 807 at the upper end of the pin 806 is spaced forwardly from the housing so as to provide means by which the pin 806 can be retracted against the action of the tension spring 808. Whenever the slide 805 is moved rearwardly from its forwardmost position an inner surface of the housing 801 acts as an abutment surface positively to prevent retraction of the pin 806 from its projecting position retaining a lamp 809 in the housing.

The lower mounting means for the lamp comprises a pin 812 received in a slot 810 at the bottom of the housing, a spring 811 urging the pin 812 forwardly towards the front of the housing. The pin 812 comprises a spherical ball portion received in a socket at the bottom of the lamp 809, a pin member 825 extending perpendicular to the axis of the pin 812 and being received in V-shaped recesses 826 so as to provide a rotational connection between the pin 812 and the lamp 809. A lever 813 is connected to the lower end of the pin 812 so as to provide a rotational drive for the pin 812.

A cam face 815 at the front end of the lever 813 engages a coacting cam face 814 on the housing 801 so that upon rotation of the lever 813 the cam face 815 causes the pin 812 to be moved rearwardly in its mounting slot against the action of the spring 811. By this means the rearward movement of the bottom of the lamp 809 causes the lamp 809 to be dipped and direct its beam downwardly whenever it is rotated from a median position. The drive to the lever 813 comes from a pin 816 passing through a slot 819 in the lever 813 and mounted in holes 821 at the ends of a U-shaped lever 817 remote from the bight of the lever 817. The lever 817 is mounted for pivoting movement about a pin 818 passing through holes 820 in the lever, the pin 818 being mounted on the housing 801. A connecting joint member 824 is carried by a slot 822 in the lever 817 and is provided with a ball joint member 823. The joint member 824 can be clamped in any required position along the length of the slot 822.

Figure 34:
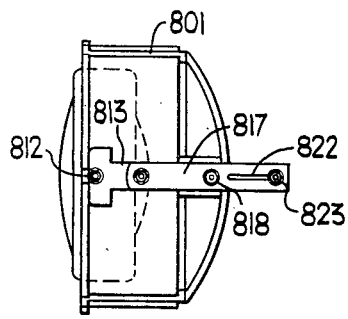
FIGURE 34 is a diagrammatic bottom plan view on a reduced scale of the lamp mounting of FIGURE 30 with the lamp pointing straight ahead.
Figure 35:
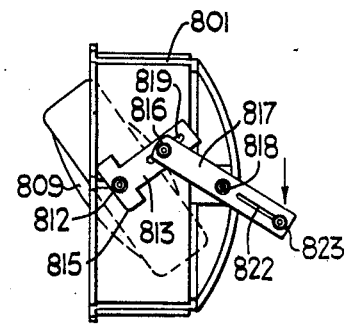
FIGURE 35 is a view similar to FIGURE 34 but showing the lamp in a rotated and dipped position.

During use of the rotating and dipping mechanism, as more clearly shown in FIGURES 34 and 35, a connection to the ball joint member 823 from the steering mechanism of the vehicle is provided so that the lever 817 is pivoted proportionately to movements of the vehicle steering mechanism. As a result of this movement of the lever 817 the lever 813 is pivoted so as to cause a rotational movement of the lamp 809 together with a rearward movement of the bottom of the lamp 809 whenever the lamp is rotated from a median position. The pin 816 and slot connection 819 provides for a lost motion so that rotational movement of the lamp 809 is not directly proportional to movements of the vehicle steering mechanism but, instead, causes a proportionately greater degree of rotation of the lamp for small movements of the vehicle steering mechanism from a straight ahead position than for larger movements of the vehicle steering mechanism.

During use of the lamp mounting it is particularly convenient that the lamp 809 can readily by replaced simply by moving the slide 805 to its forwardmost position so that the pin 806 can be retracted against the action of the spring 808 to release the top of the lamp 809. The lamp 809 can then be tilted forward clear of the top of the housing and lifted clear of the pin 812 and cross member 825.

I claim:

1. A lamp mounting for supporting a lamp on a steerable vehicle having steering mechanism, such lamp mounting comprising a lamp support; a mounting member tube adapted to be secured to the vehicle; a supporting member tube rotatably carried by the mounting member tube, the lamp support being carried for tilting movement by the supporting member tube; means for connecting the lamp support to the vehicle steering mechanism whereby the support is rotatable with respect to the mounting member tube to cause rotational movements of the lamp thereon from side to side in response to movements of the vehicle steering mechanism; and means for dipping the lamp by downward tilting of the lamp support in response to rotational movement of the lamp support to either side of a median position; said means for tilting the lamp comprising co-acting cam means provided between the mounting member tube and the lamp support whereby the support is tilted in response to rotational movements of the supporting member tube with respect to the mounting member tube, the cam means comprising a follower on the lamp support and a cam surface on the mounting member tube the cam means comprising a follower on the lamp support and a cam surface on the mounting member tube contacted by said follower with said cam surface comprising a peak corresponding with the median position of the lamp, the supporting member tube comprising a slot through which the follower extends to engage said cam surface on the mounting member tube.

2. A lamp mounting according to claim 1, wherein an electrical switch operable by the means connecting the lamp support and the steering mechanism is provided for automatically switching on a lamp carried by the support when the vehicle steering mechanism has been rotated through a predetermined angle, and a further electrical switch is provided responsive to movements of the means connecting the lamp support and the steering mechanism for dipping the vehicle headlights whenever the steering mechanism is turned through a predetermined angle.

3. A lamp mounting for supporting a lamp on a steerable vehicle having steering mechanism, such lamp mounting comprising a lamp support; a mounting member adapted to be secured to the vehicle; and means for connecting the lamp support to the vehicle steering mechanism whereby the support is rotatable with respect to the mounting member to cause rotational movements of a lamp thereon from side to side in response to movements of the vehicle steering mechanism, said means for connecting the lamp support to the vehicle steering mechanism comprising a linkage including a safety member comprising a tube and a rod slidably received in the tube such that when the force between the ends of the tube and rods exceeds a predetermined value the rod slides relative to the tube.

4. A lamp mounting according to claim 3, wherein an electrical switch operable by the means connecting the lamp support and the steering mechanism is provided for automatically switching on a lamp carried by the support when the vehicle steering mechanism has been rotated through a predetermined angle, and a further electrical switch is provided responsive to movements of the means connecting the lamp support and the steering mechanism for dipping the vehicle headlights whenever the steering mechanism is turned through a predetermined angle.

5. A lamp mounting for supporting a lamp on a steerable vehicle having steering mechanism, such lamp mounting comprising a lamp support; a mounting member adapted to be secured to the vehicle; a supporting member rotatably carried by the mounting member, the lamp support being carried for tilting movement by the supporting member; means for connecting the lamp support to the vehicle steering mechanism whereby the support is rotatable with respect to the mounting member to cause rotational movements of a lamp thereon from side to side in response to movements of the vehicle steering mechanism; and means for dipping the lamp by downward tilting of the lamp support in response to rotational movement of the lamp support to either side of a median position, the supporting and mounting members both being tubular, and the means for tilting the lamp support in response to rotational movement thereof comprising a cap carrying the lamp support, fitting over the top of the tubular supporting and mounting members and comprising a cam follower, a cam surface provided at the top of the mounting member, and a spring extending internally of the supporting and mounting members to hold the cam follower in engagement with the cam surface.

6. A lamp mounting for supporting a lamp on a steerable vehicle having steering mechanism, such lamp mounting comprising a lamp support, a mounting member adapted to be secured to the vehicle; a supporting member rotatably carried by the mounting member, the lamp support being carried for tilting movement by the supporting member; means for connecting the lamp support to the vehicle steering mechanism whereby the support is rotatable with respect to the mounting member to cause rotational movements of a lamp thereon from side to side in response to movements of the vehicle steering mechanism, such means comprising a first pulley adapted to be drivingly connected to the supporting member, a second pulley adapted to be directly actuable by the vehicle steering mechanism, a cable connection between said pulleys, and a releasable clutch for connecting the first pulley to the supporting member, said second pulley including a drive connection adapted to slip when a predetermined torque is applied to said second pulley; and means for dipping the lamp by downward tilting of the lamp support in response to rotational movement of the lamp support to either side of a median position.

7. A lamp mounting according to claim 6, wherein an electrical switch operable by the means connecting the lamp support and the steering mechanism is provided for automatically switching on a lamp carried by the support when the vehicle steering mechanism has been rotated through a predetermined angle, and a further electrical switch is provided responsive to movements of the means connecting the lamp support and the steering mechanism for dipping the vehicle headlights whenever the steering mechanism is turned through a predetermined angle.

8. A lamp mounting for a vehicle having a steering mechanism and comprising a mounting member adapted to be fixed to the vehicle and means for mounting a lamp on the mounting member, such means including a suspension piece and a pivotal lamp support carried by the mounting member, a linkage for connecting the lamp support to the vehicle steering mechanism whereby the lamp support is pivotable about a substantially vertical axis in response to steering movement of the vehicle steering mechanism and a cam means for tilting the lamp support axis about said lamp suspension piece in response to rotational movements of the lamp support about said support axis, said cam means being provided remote from said suspension piece and being operable to displace the support substantially horizontally to tilt the support axis about said lamp suspension piece.

9. A lamp mounting according to claim 8, wherein the mounting member comprises an open fronted housing provided with slots at its top and bottom, and the lamp support comprises a pin received in one of the slots, the lamp suspension piece being received in the other slot whereby a lamp may be supported between the lamp suspension piece and the lamp support.

10. A lamp mounting according to claim 9, wherein the cam means comprises a cam mounted directly upon the support pin, a portion of the mounting member and spring means biasing the said cam against said portion of the mounting member, whereby said portion of the support member engaged by the cam comprises a stationary cam follower operable to cause backwards and forwards movement of the support pin by action of the cam during rotational movement thereof.

11. A lamp mounting according to claim 9, wherein the support comprises a substantially horizontally extending arm, the cam means comprises a projection from said arm and a cam surface on the mounting member engaged by said projection, said cam surface extending transversely of the direction of tilting movement of the support axis, and the linkage comprises a drive rod pivotally connected to the support arm whereby longitudinal movement of the drive rod causes pivoting rotational movement of the support.

12. A lamp mounting according to claim 11, wherein the drive rod is adapted to be mounted for movement transversely of the vehicle and is connected to the vehicle steering mechanism by a driving connection, said steering mechanism including a track rod and the driving connection including a link having two ends and adapted to be pivotally secured at one end of the track rod, a drop arm, a universal joint connecting the other end of the link to one end of the drop arm, a spindle rigidly secured to the drop arm, and a second drop arm rigidly secured to the spindle, the drive rod being connected to said second drop arm.

13. A lamp mounting according to claim 12, said vehicle steering mechanism including a steering actuator member and a universal joint connecting said actuator member to said track rod, and the pivotal connection between the one end of the link and the track rod having its axis aligned with the joint connecting the track rod with the vehicle steering actuator member.

14. A lamp mounting according to claim 8, wherein an electrical switch operable by the means connecting the lamp support and the steering mechanism is provided for automatically switching on a lamp carried by the support when the vehicle steering mechanism has been rotated through a predetermined angle, and a further electrical switch is provided responsive to movements of the means connecting the lamp support and the steering mechanism for dipping the vehicle headlights whenever the steering mechanism is turned through a predetermined angle.

15. A lamp mounting according to claim 8, wherein a lost motion connection is provided in the linkage for connecting the lamp support to the vehicle steering mechanism whereby rotational movement of the support is not directly proportional to movements of the steering mechanism.

16. A lamp mounting according to claim 15, wherein the support comprises an arm extending away from the support axis, the lost motion connection comprises a pivotal lever having one end adapted to be connected for pivotal movement by the linkage to the steering mechanism, a pin and slot connection being provided between the other end of the lever and said support arm.

17. A lamp mounting according to claim 8, wherein a manual control is provided for controlling from the vehicle dash-board the position of the suspension piece along the slot.

18. A lamp mounting according to claim 17, wherein a linkage is provided for connecting the manual control to the suspension piece, said linkage including a lever pivotally mounted on the mounting member, a cable connection from one end of the lever to said manual control, and a connection between the other end of the lever and the suspension piece whereby movement of the manual control causes pivotal movement of the lever which in turn positions the suspension piece along the slot as required.

19. A lamp mounting according to claim 17, wherein means are provided for connecting the suspension piece to said manual control, such connecting means comprising a piano wire provided with a flexible tubular casing.

20. A lamp mounting according to claim 17, in combination with a similar lamp mounting, said lamp mounting being adapted to be mounted one on either side of the vehicle, there being provided a linkage from said manual control to the suspension piece of each lamp mounting constructed such that when mounted in the vehicle the near side lamp starts moving before the off-side lamp when the manual control is operated to move the lamps from their fully downwardly deflected or dipped position.

21. A lamp mounting according to claim 17, which includes an adjustable stop for limiting movement of the lamp from its dipped position.

22. A lamp mounting according to claim 21, wherein the manual control comprises a pivotal rod adapted to be mounted under the dash board of the vehicle, a lever extending radially from said rod, and a bracket secured to said rod, the adjustable stop comprising a stop member engageable with said bracket for limiting rotation of the rod in one direction.

23. A lamp mounting according to claim 22, wherein graduations are marked to facilitate positioning of the stop member in accordance with the various possible loadings of a vehicle to which the lamp mounting is fitted.

24. A lamp mounting for a vehicle having a resilient suspension and comprising a mounting member adapted to be fixed to the vehicle and including a slot extending longitudinally of the vehicle; a lamp suspension piece received in said slot and adapted to have a lamp secured thereto; and means for connecting said suspension piece with the vehicle suspension for varying the position of the suspension piece in the slot to change the angle of projection of a beam from the lamp relative to the mounting member whereby variation in loading or attitude of the vehicle causes movement of the suspension piece along the slot, the means for connecting the suspension piece to the vehicle suspension comprising a Bowden cable, and means for equalizing variation in movements for the suspension on opposite sides of the vehicle, said equalizing means comprising a junction box adapted to be secured to the vehicle, the Bowden cable leading to the junction box, two further cables leading from the junction box for connection respectively to the vehicle suspension on opposite sides of the vehicle, and spring connections between the cable connected to the suspension piece and each of the further cables adapted to be connected to the vehicle suspension.

25. A vehicle lamp mounting adapted to support a lamp on a steerable vehicle having a steering mechanism including a track rod, a steering actuator member and a universal joint connecting the track rod and steering actuator member, said lamp mounting comprising a support for a lamp secured thereto and a mounting member adapted to be secured to the vehicle, and means for connecting the support to the vehicle steering mechanism for rotating the support with respect to the mounting member to cause rotational movements of a lamp thereon from side to side in response to movements of the steering mechanism, the arrangement being such that the lamp is dipped by downwardly tilting in response to rotational movement to either side of a median position, the means for connecting the support to the steering mechanism including a linkage having a link provided with a universal joint connection at one end and pivotally connected at the other end to a vehicle steering track rod with the axis of the pivotal connection aligned with the joint connecting the track rod with a steering actuator member.

26. A lamp mounting according to claim 25, wherein the steering actuator member comprises the rack of a rack and pinion steering mechanism which includes a ball joint connecting the rack to the track rod, the axis of the pivotal connection being aligned with the centre of said ball joint.

27. A vehicle lamp mounting comprising a mounting member adapted to be fixed to a vehicle having a steering mechanism including a track rod, means for mounting a lamp support pivotable about a substantially vertical axis, a linkage for connecting the lamp support to the vehicle steering mechanism whereby the lamp support is pivotable about its substantially vertical axis in response to steering movement of the steering mechanism, and means for tilting the lamp support in response to rotational movements of the lamp support thereabout, the linkage for connecting the lamp support to the vehicle steering mechanism comprising a drop arm adapted to extend substantially perpendicularly to the track rod of the vehicle steering mechanism and having an end adjacent the track rod, a universal joint connected to said drop arm end, and a link connected at one end by said universal joint to said end of the drop arm adjacent the track rod, the other end of the link being adapted to be pivotally connected to the vehicle steering track rod with the axis of the pivotal connection being aligned with the joint connecting the track rod with a steering actuator member.

28. A vehicle lamp mounting adapted to support a lamp on a steerable vehicle and comprising a support adapted to have a lamp secured thereto and a mounting member adapted to be secured to the vehicle, and means for connecting the support to the vehicle steering mechanism whereby in use of the lamp mounting the support is rotatable with respect to the mounting member to cause rotational movements of a lamp thereon from side to side in response to movements of the steering mechanism, the arrangement being such that the lamp is dipped by downwardly tilting in response to rotational movement to either side of a median position, the means for connecting the support to the steering mechanism including a linkage having a link provided with a universal joint connection at one end and a pivotal connection at the other end to a vehicle steering track rod with the axis of the pivotal connection aligned with the joint connecting the track rod with a steering actuator member.

29. A vehicle lamp mounting comprising a housing, and lamp support means at the top and bottom of the housing, one of said lamp support means comprising a slide movable longitudinally of the housing and a pin carried by said slide whereby in a forwardmost position the pin carrying portion of the slide projects from said housing, a spring normally biasing and holding the pin in a projecting lamp engaging position whereby in the forwardmost position of the slide the pin is retractable from the lamp against the bias to release the lamp for removal from the housing, the housing including means for preventing retraction of the pin when the slide is rearwardly displaced from its forwardmost position.

30. A lamp mounting according to claim 29, wherein the means for preventing retraction is an abutment surface of the housing.

31. A lamp mounting according to claim 29, including manually operable means for controlling the position of the slide longitudinally of the housing.

32. A lamp mounting according to claim 31, wherein the slide has a bore provided therethrough and the pin is a pivot pin mounted for sliding movement in said bore against the spring bias.

33. A lamp mounting according to claim 29, wherein the other of the lamp support means comprises a rotatable drive pin having a driving connection for rotatably driving a lamp carried by the housing.

34. A lamp mounting according to claim 33, wherein a slot extends longitudinally of the bottom of the housing and the drive pin is mounted for sliding movement perpendicular to its axis in said slot, the mounting including a spring biasing said drive pin against sliding movement rearwardly of the housing.

35. A lamp mounting according to claim 34, including cam means for causing this rearward sliding movement of the drive pin as a function of rotational movement of a lamp carried by the mounting from a median position.

36. A lamp mounting according to claim 35, wherein the lamp includes a socket having V-shaped recesses to either side thereof, and the drive pin is receivable in said socket in the lamp with the driving connection comprising a member projecting from the drive pin perpendicular to the axis thereof and engageable in said recesses.

References Cited

UNITED STATES PATENTS

| Number | Date | Name | Class |
|---|---|---|---|
| 1,105,247 | 7/1914 | Bump et al. | 240—61.5 |
| 1,118,354 | 11/1914 | Kalhaus | 240—8.24 X |
| 1,240,695 | 9/1917 | Fox | 240—61.6 |
| 1,249,421 | 12/1917 | Klein | 240—8.25 X |
| 1,250,277 | 12/1917 | Bryant | 240—62.72 |
| 1,257,430 | 2/1918 | Westhafer | 240—61.6 |
| 1,259,252 | 3/1918 | McCaskey | 240—41.6 X |
| 1,368,430 | 2/1921 | Gould | 240—41.6 |
| 1,376,237 | 4/1921 | Voss | 240—41.6 X |
| 1,393,278 | 10/1921 | Gauntt | 240—61.6 |
| 1,511,105 | 10/1924 | Camblin | 240—41.6 |
| 1,603,315 | 10/1926 | Calkins | 240—8.25 X |
| 1,611,883 | 12/1926 | Calkins | 240—8.25 |
| 1,620,198 | 3/1927 | Farwell | 240—61.6 |
| 1,689,712 | 10/1928 | Barber | 240—62.52 |
| 1,967,515 | 7/1934 | Ricker | 240—7.1 |
| 1,971,174 | 8/1934 | Desnoyers | 240—61.5 |
| 2,105,866 | 1/1938 | Sheaffer | 240—7.1 |
| 2,984,737 | 5/1961 | Marcellus | 240—7.1 |

NORTON ANSHER, Primary Examiner

MONROE H. HAYES, Assistant Examiner

U.S. Cl.X.R.

240—8.24, 8.25, 41.55, 41.6, 61.4, 61.5, 61.6, 62.73